US 6,598,385 B1

(12) United States Patent
Abel et al.

(10) Patent No.: US 6,598,385 B1
(45) Date of Patent: Jul. 29, 2003

(54) TWO STAGE GAS PILOT VALVE CONTROLLING GAS FLOW TO A REACTION JET NOZZLE

(75) Inventors: Stephen G. Abel, Chandler, AZ (US); Donald J. Christensen, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/195,792

(22) Filed: Nov. 19, 1998

(51) Int. Cl.$^7$ .............................. F02K 9/52; F02K 9/80; F02K 9/68
(52) U.S. Cl. .............................. 60/204; 60/228; 60/258; 244/169
(58) Field of Search .......................... 60/204, 228, 229, 60/258, 259, 242; 244/169, 74

(56) References Cited

U.S. PATENT DOCUMENTS

| | | | | |
|---|---|---|---|---|
| 2,930,187 A | * | 3/1960 | Chillson et al. | 60/259 |
| 2,949,007 A | * | 8/1960 | Aldrich et al. | 60/259 |
| 3,017,745 A | * | 1/1962 | Shirley et al. | 60/259 |
| 3,721,402 A | * | 3/1973 | Holland | 60/229 |
| 3,910,037 A | * | 10/1975 | Salkeld | 60/259 |
| 3,910,314 A | | 10/1975 | Nicholson | |
| 4,922,963 A | | 5/1990 | Robinson | |
| 5,062,593 A | * | 11/1991 | Goddard et al. | 244/169 |
| 5,117,868 A | | 6/1992 | Wagner | |
| 5,240,041 A | | 8/1993 | Garnjost | |

* cited by examiner

Primary Examiner—Ted Kim
(74) Attorney, Agent, or Firm—Keith A. Newburry, Esq.

(57) ABSTRACT

A multi-stage pilot valve is disclosed for selectively supplying a working fluid to and venting from a reaction jet main stage actuation chamber. In a preferred embodiment of the invention, the pilot valve comprises a solenoid actuated ball and socket flapper valve having a pressure inlet, an exhaust outlet and a service port. The first stage service port is in fluid communication with a second stage actuation chamber. A piston disposed in the second stage actuation chamber operatively engages a ball member of a ball-and-seat type valve comprising the second stage valve. The second stage valve also comprises a pressure inlet, an exhaust outlet and a service port. The piston and ball are sized relative to each other such that when the second stage actuation chamber is pressurized by the first stage, the force is sufficient to seat the ball against the second stage pressure inlet. This shuts off the flow of high pressure gases to the second stage service port and permits the second stage service port to vent through the exhaust port. When the second stage actuation chamber is vented by the first stage valve, the pressure acting on the ball is sufficient to seat the ball against the second stage exhaust outlet. This opens the second stage pressure inlet to permit high pressure gases to enter the second stage service port. The bi-directional movement of the ball member of the second stage valve is accomplished entirely by fluid pressure, thus enabling a fast responding, high flow rate regulation of the hot gases using low electrical power and eliminating the use of springs or other resilient members that would be of dubious reliability operating in a hot gas environment.

10 Claims, 2 Drawing Sheets

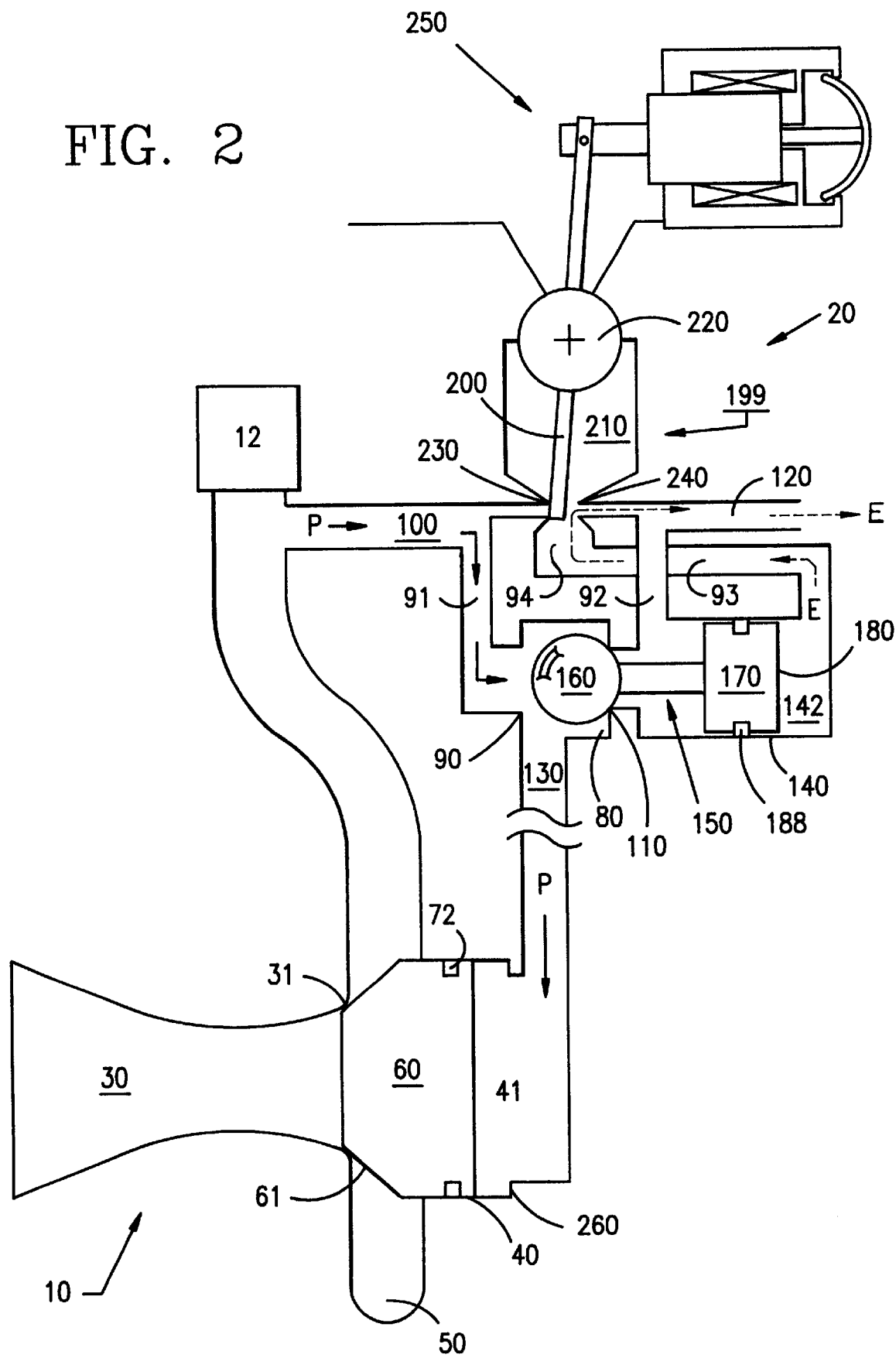

TWO STAGE GAS PILOT VALVE CONTROLLING GAS FLOW TO A REACTION JET NOZZLE

FIELD OF THE INVENTION

The present invention relates generally to valving devices. More particularly, the invention relates to a pilot valve for regulating hot gases from a rocket motor or gas generator to a reaction jet.

The U.S. Government may have certain rights in this invention.

BACKGROUND OF THE INVENTION

Pilot valves are frequently used in missile and space vehicle flight control systems to control the reaction jets that vary the pitch, yaw, spin rate and other dynamic characteristics of a vehicle in flight. The pilot valve enables on/off control over the propulsive gases, typically comprising the output of a solid rocket motor or gas generator, supplied to the jet nozzle. The pilot valve accomplishes this by allowing venting and pressurization of a main stage actuation chamber operatively disposed with the jet nozzle. Such pilot valves typically are single stage in configuration and may utilize a solenoid-actuated flapper valve that, when in a first position, permits high temperature pressurized gas to be communicated to the actuation chamber, thereby activating a valve that causes flow through the jet nozzle to be shut off. When in a second position, the flapper valve permits the actuation chamber to communicate residual pressurized gas therein to a vent port, thereby allowing deactivation of the valve and flow through the jet nozzle to be initiated or resumed. Additionally, because the gases flowing through the pilot valve may exceed 3500 degrees Fahrenheit, each valve component that may be exposed to these gases must be capable of withstanding these high temperatures.

Among the disadvantages of single stage valves is sensitivity to leakage of the main stage actuation chamber if the valves are sized sufficiently small to provide a fast response time. Further, if single stage valves are sized to accommodate main stage leakage, they require relatively high solenoid power and achieve unacceptably low response rates. Because missiles and space vehicles typically move at high rates of speed, it is critical to the control of such craft that the reaction jets have a high rate of response between their respective on and off positions.

Two-stage pilot valves are known in the art. For example, U.S. Pat. No. 5,117,868 ("the '868 patent") discloses a valve for use in conjunction with aircraft flight control hydraulic systems. The valve has a main stage comprising a pressure inlet chamber having an inlet port, a service chamber having a service port and a return chamber having a return port. A moveable main valving element is urged by a valve spring housed within a spring chamber into a first position for shutting off the service chamber from the pressure inlet chamber and communicating the service chamber to the return chamber. The pressure inlet chamber is connected via an internal duct to the spring chamber such that the valve spring is exposed to working fluid. Components of the valve disclosed in the '868 patent (e.g., the spring and spot valve) are not likely to function reliably if exposed to high temperature rocket exhaust gases. Accordingly, the valve disclosed in the '868 patent is not suitable for reaction jet flight control systems.

Accordingly, a need exists for a multi-stage directional pilot valve that can accommodate high temperature gas flow associated with solid propellant propulsion therethrough.

SUMMARY OF THE INVENTION

In accordance with the present invention, a multi-stage pilot valve is disclosed for selectively supplying high temperature gas to and venting gas from a reaction jet main stage actuation chamber.

In a preferred embodiment of the invention, the pilot valve comprises a solenoid actuated ball and socket flapper valve having a pressure inlet, an exhaust outlet and a service port. The first stage service port is in fluid communication with a second stage actuation chamber. A piston disposed in the second stage actuation chamber operatively engages a ball member of a ball-and-seat type valve comprising the second stage valve. The second stage valve also comprises a pressure inlet, an exhaust outlet and a service port. The piston and ball are sized relative to each other such that when the second stage actuation chamber is pressurized by the first stage, the force acting on the piston is sufficient to seat the ball against the second stage pressure inlet. This shuts off the flow of high pressure gases to the second stage service port and permits the second stage service port to vent through the exhaust port thus venting the reaction jet main stage actuation chamber.

When the second stage actuation chamber is vented by the first stage valve, the pressure acting on the ball is sufficient to overcome the force acting on the piston. This opens the second stage pressure inlet to permit high pressure gases to enter the ball chamber and exit through the second stage service port. The pressure in the ball chamber seats the ball member against the second stage exhaust outlet seat, shutting off communication between the second stage service port and the exhaust port.

The bi-directional movement of the ball member of the second stage valve is accomplished entirely by fluid pressure, thus enabling a fast responding, high flow rate regulation of the hot gases without the use of springs or other resilient members that would be of dubious reliability operating in a hot gas environment.

BRIEF DESCRIPTION OF THE DRAWING

FIG. 2 depicts a schematic analogous to FIG. 1 of the valve according to the present invention in main stage actuation chamber pressurization mode.

DESCRIPTION OF THE PREFERRED EMBODIMENT

Figure 1:
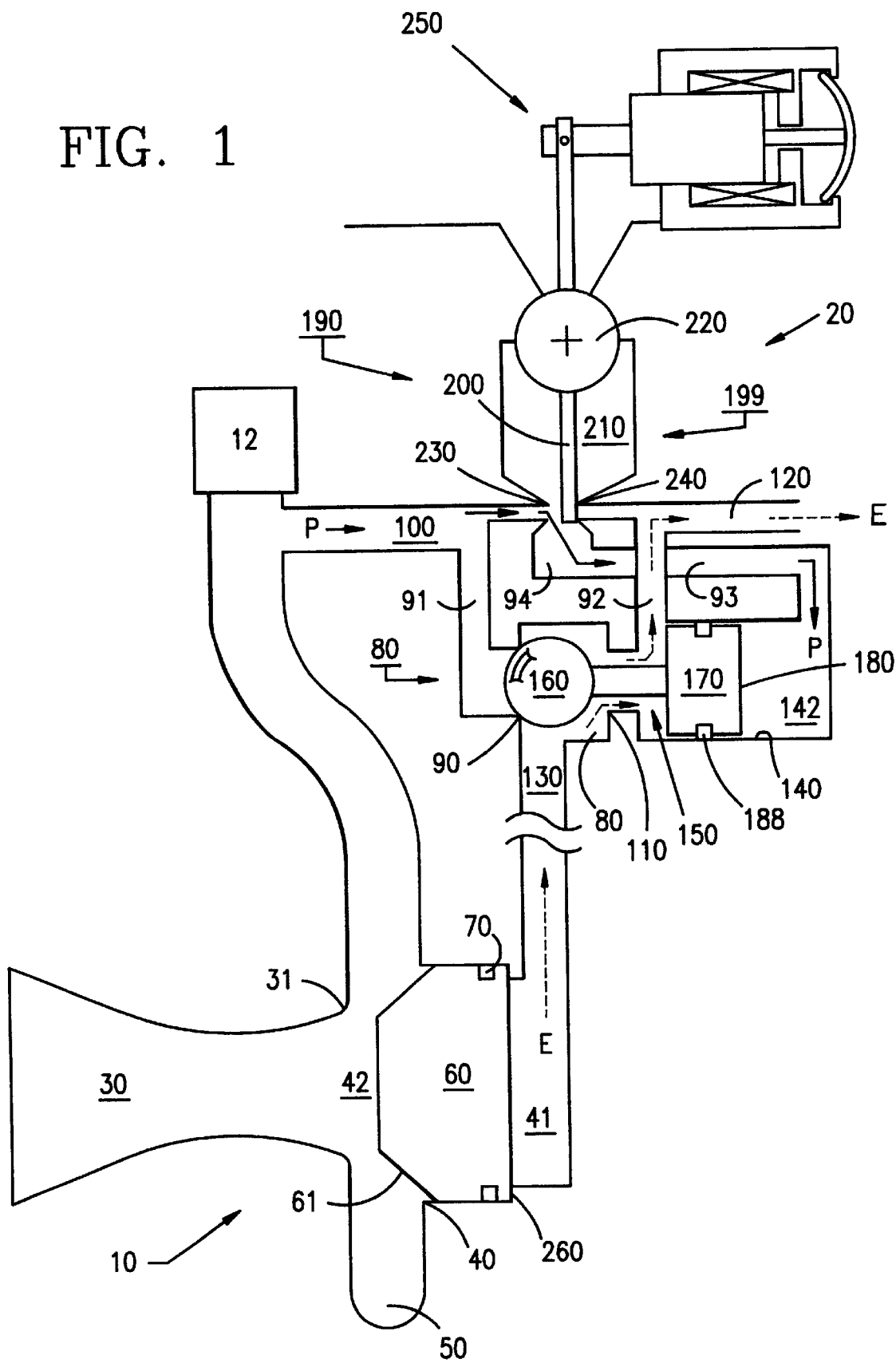
FIG. 1 depicts a schematic of a reaction jet in cooperation with the valve according to the present invention in main stage actuation chamber venting mode.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows in cross-section a reaction jet 10 in cooperation with a pilot valve 20 incorporating features of the present invention. Reaction jet 10 comprises a jet nozzle 30 and a main stage plenum 42. An annular passage 50 supplies pressurized fluid to be discharged through jet nozzle 30. Disposed within bore 40 and juxtaposed with the valve seat 31 of jet nozzle 30 is a poppet valve 60. Poppet valve 60 regulates the flow of pressurized fluid from annular passage 50 through jet nozzle 30 by moving alternately between a fully opened position as shown in FIG. 1 and a closed position as shown in FIG. 2. As shown in FIG. 1, in the fully open position, poppet valve face 61 is retracted from poppet valve seat 31. As shown in FIG. 2, in the closed position, poppet valve face 61 is seated against poppet valve seat 31 thereby sealing annular passage 50 from plenum 42. Poppet valve 60 is urged between the open and closed positions by the pressure balance between the fluid pressure in plenum 42 and annulus 50 and the fluid pressure in main stage actuation chamber 41. When the pressure in main stage actuation chamber 41 is greater than the pressure in plenum 42 and annulus 50, poppet valve 60 is urged towards the closed position. Conversely, when the pressure in main stage actuation chamber 41 drops such that the pressure in plenum 42 and annulus 50 is greater than the pressure in main stage actuation chamber 41, poppet valve 60 is urged toward the fully open position. An undercut stop 260 or similar feature in bore 40 limits the travel of poppet valve 60 in the open direction. A circumferential piston seal 72 prevents fluid communication between plenum 42 and annulus 50 and main stage actuation chamber 41.

Pilot valve 20 comprises a second stage 70 comprising a ball chamber 80 having a second stage inlet valve seat 90 in fluid communication with a supply port 100 through a supply conduit 91 and a second stage exhaust valve seat 110 fluidly communicating with an overboard vent port 120 through an exhaust conduit 92. Ball chamber 80 is in fluid communication with main stage actuation chamber 41 through a second stage service port 130.

The ball member 160 of a ball-and-seat type shuttle valve 150 is disposed within ball chamber 80. Second stage actuation chamber 142 comprises a bore 140 adjacent ball chamber 80 into which is disposed a shuttle piston 170. Second stage actuation chamber 142 communicates with first stage service port 94 through a conduit 93. The shuttle piston 170 of shuttle valve 150 has a surface 180 exposed to fluid pressure in second stage actuation chamber 142. A circumferential piston seal 188 prevents leakage from second stage actuation chamber 142 past shuttle piston 170.

First stage valve 190 comprises a ball and socket type flapper valve 199. Valve 199 comprises a flapper 200 disposed within a flapper cavity 210. Flapper 200 is rotatably supported by a ball and socket joint 220 and is actuated by a solenoid 250 between a first and second position in which flapper 200 forcefully abuts either a first stage supply nozzle 230 or a vent nozzle 240, thereby alternatively connecting service port 94 to the supply P or exhaust E. Ball and socket joint 220 provides a seal between flapper cavity 210 and solenoid 250 to ensure that solenoid 250 is not exposed to hot gases present in flapper cavity 210.

As shown in FIG. 1, during venting of main stage actuation chamber 41, flapper 200 abuts vent nozzle 240 and opens supply nozzle 230, thereby allowing pressurized fluid from supply port 100 to enter first stage service port 94 while simultaneously preventing fluid communication between first stage service port 94 and vent port 120. The pressurized fluid is conveyed from first stage service port 94 to second stage actuation chamber 142 through conduit 93 when it dead-heads against surface 180 of shuttle piston 170. The pressure acting on surface 180 urges shuttle piston 170 against ball member 160, moving ball member 160 toward second stage inlet valve seat 90. Because the area of inlet valve seat 90 is smaller than that of surface 180 of shuttle piston 170, the fluid force acting upon surface 180 exceeds the fluid force acting on ball member 160. Accordingly, ball member 160 is forced into substantially static sealing abutment against inlet valve seat 90 leaving exhaust valve seat 110 substantially open. With ball member 160 so situated, the pressurized gases within main stage actuation chamber 41 flow through second stage service port, past exhaust valve seat 110 into conduit 92 and overboard through vent port 120. As main stage actuation chamber 41 depressurizes, poppet valve 60 is urged by the fluid pressure present in plenum 42 and annulus 50 toward the fully open position against annular stop 260. With poppet valve 60 situated against stop 260, hot gas emitted by annular passage 50 is permitted to escape through nozzle 30 creating thrust.

As shown in FIG. 2, during pressurization of main stage actuation chamber 41, flapper 200 is removed from vent nozzle 240 and forcibly placed in abutment with supply nozzle 230 thereby preventing communication between supply port 100 and second stage actuation chamber 142. With flapper 200 removed from vent nozzle 240, second stage actuation chamber 142 is allowed to depressurize via conduit 93 through first stage service port 94 through vent nozzle 240 and ultimately through vent port 120. With second stage actuation chamber 142 depressurized, the fluid force at inlet valve seat 90 exceeds that acting upon surface 180 of shuttle piston 170 such that ball member 160 is urged away from second stage inlet valve seat 90 and forced into substantially static sealing abutment against second stage exhaust valve seat 110. With inlet valve seat 90 substantially open, hot gas supplied from supply port 100 through valve seat 90 is communicated to and pressurizes main stage actuation chamber 41 through second stage service port 130. As main stage actuation chamber 41 pressurizes, poppet valve 60 is urged toward nozzle 30 such that poppet valve face 61 sealingly engages valve seat 31. With poppet valve 60 engaged with valve seat 31, hot gas supplied to nozzle 30 by annular passage 50 is shut off, thereby discontinuing thrust associated with reaction jet 10. As can be determined from the foregoing, the bi-directional urging of ball member 160 is accomplished entirely by fluid pressure, thereby obviating the need for springs or other resilient members that would be of dubious reliability operating in a hot gas environment.

In the preferred embodiment, the entirety of shuttle valve 150, chambers 80, 140, conduits 91, 92, 93 flapper 200 flapper cavity 210 and socket joint 220 are comprised of graphite or rhenium, enabling each to withstand exposure to hot gases. It should be noted, however, that each of the above elements may be comprised of other materials know in the art to withstand elevated temperatures and corrosive combustion by-products of solid rocket motors and gas generators. It should further be noted that, according to principles of the present invention, pilot valve 20 is not necessarily limited to supplying and venting high temperature gases; pilot valve 20 can be used to supply and vent any fluid, as necessary.

Various modifications and alterations of the above described sealing apparatus will be apparent to those skilled in the art. For example, shuttle valve 150 may be a three way valve known in the art other than the ball-and-seat type described above. In addition, other actuating elements known in the art may be substituted for solenoid 250. In addition, other rotatable or otherwise moveable sealing elements known in the art may be substituted for ball-and-socket joint 220. Accordingly, the foregoing detailed description of the preferred embodiment of the invention should be considered exemplary in nature and not as limiting to the scope and spirit of the invention as set forth in the following claims.

What is claimed is:

1. A reaction jet for a maneuvering aerospace vehicle comprising:
   a pyrotechnic gas generator for providing a source of pressurized gas;
   a nozzle for directing said pressurized gas, said nozzle comprising a primary valve regulating a flow of gas through said nozzle, said primary valve operatively coupled to a control chamber;
   a pilot valve for selectively supplying said pressurized gas to and venting pressurized gas from said control chamber, the pilot valve comprising:
   a first stage valve comprising a first pressure inlet, a first service port and a first exhaust outlet, said first stage valve further comprising a first stage valve member moveable between a first position and a second position, the first position allowing fluid communication between said first pressure inlet and said first service port, the second position allowing fluid communication between said first service port and said first exhaust outlet; and
   a second stage valve comprising a second stage valve chamber, a second pressure inlet, a second service port and a second exhaust outlet, said second stage valve further comprising a second stage valve member disposed within said second stage valve chamber and moveable between an inlet position and an exhaust position, the inlet position allowing fluid communication between said second pressure inlet and said second service port, the exhaust position allowing fluid communication between said second service port and said second exhaust outlet, said second stage valve member being responsive to pressure in the first service port to move said second stage valve member.

2. The reaction jet of claim 1, wherein said second stage valve comprises a ball and seat valve having a ball valve member.

3. The reaction jet of claim 1, wherein said first stage valve comprises a dry solenoid actuated flapper valve.

4. A reaction jet for a maneuvering aerospace vehicle comprising:
   a pyrotechnic gas generator for providing a source of pressurized gas;
   a nozzle for directing said pressurized gas, said nozzle comprising a primary valve regulating a flow of gas through said nozzle, said primary valve operatively coupled to a control chamber;
   a pilot valve for selectively supplying said pressurized gas to and venting pressurized gas from said control chamber, the pilot valve comprising:
   a first stage valve comprising a first pressure inlet, a first service port and a first exhaust outlet, said first stage valve further comprising a first stage valve member moveable between a first position and a second position, the first position allowing fluid communication between said first pressure inlet and said first service port, the second position allowing fluid communication between said first service port and said first exhaust outlet;
   a second stage valve comprising a second stage valve chamber, a second pressure inlet, a second service port and a second exhaust outlet, said second stage valve further comprising a second stage valve member disposed within said second stage valve chamber and moveable between an inlet position and an exhaust position, the inlet position allowing fluid communication between said second pressure inlet and said second service port, the exhaust position allowing fluid communication between said second service port and said second exhaust outlet, said second stage valve member being responsive to pressure in the first service port to move said second stage valve member; and
   a valve actuator operatively coupled to said second stage valve member, said valve actuator comprising a moveable actuating member and an actuator chamber, said moveable actuating member being operatively coupled to said actuator chamber and said actuator chamber being in fluid communication with said first service port, said moveable actuating member being responsive to rising pressure in said actuator chamber to move said second stage valve member from the inlet position to the exhaust position and being responsive to falling pressure in said actuator chamber to permit said second stage valve member to move from the exhaust position to the inlet position.

5. The reaction jet of claim 4, wherein:
   said moveable actuating member comprises a piston disposed in said actuator chamber.

6. The reaction jet of claim 4, wherein said second stage valve comprises a ball and seat valve having a ball valve member.

7. The reaction jet of claim 4, wherein said first stage valve comprises a dry solenoid actuated flapper valve.

8. A reaction jet for a maneuvering aerospace vehicle comprising:
   a pyrotechnic gas generator for providing a source of pressurized gas;
   a nozzle for directing said pressurized gas, said nozzle comprising a primary valve regulating a flow of gas through said nozzle, said primary valve operatively coupled to a control chamber;
   a pilot valve for selectively supplying said pressurized gas to and venting pressurized gas from said control chamber, the pilot valve comprising:
   a first stage valve comprising a first pressure inlet, a first service port and a first exhaust outlet, said first stage valve further comprising a first stage valve member moveable between a first position and a second position, the first position allowing fluid communication between said first pressure inlet and said first service port, the second position allowing fluid communication between said first service port and said first exhaust outlet;
   a second stage valve comprising a second stage valve chamber, a second pressure inlet, a second service port and a second exhaust outlet, said second stage valve further comprising a second stage valve member disposed within said second stage valve chamber and moveable between an inlet position and an exhaust position, the inlet position allowing fluid communication between said second pressure inlet and said second service port, the exhaust position allowing fluid communication between said second service port and said second exhaust outlet, said second stage valve member being responsive to pressure in the first service port to move said second stage valve member;
   a valve actuator operatively coupled to said second stage valve member, said valve actuator comprising a moveable actuating member and an actuator chamber, said moveable actuating member being operatively coupled to said actuator chamber and said actuator chamber being in fluid communication with said first service port, said moveable actuating member being responsive to rising pressure in said actuator chamber to move said second stage valve member from the inlet position to the exhaust position and being responsive to falling pressure in said actuator chamber to permit said second stage valve member to move from the exhaust position to the inlet position, said moveable actuating member comprises a piston disposed in said actuator chamber; said piston having a surface with a first area exposed to pressure in said actuator chamber; and said second pressure inlet having a valve seat with a cross sectional area less than said first area such that when equal pressure is in said actuator chamber and said second pressure inlet, a force unbalance causes said valve member to be seated against said valve seat.

9. A method of controlling a reaction jet comprising a nozzle and a primary valve having a primary valve member moveable between an open and a closed position for regulating a flow of gases through the nozzle, the method comprising:

initiating a pyrotechnic gas generator to provide a source of pressurized gas;

introducing a first portion of the pressurized gas into a first stage valve having a first stage valve chamber;

introducing a second portion of the pressurized gas into a second stage valve having a second stage valve chamber;

introducing a third portion of the pressurized gas into the primary valve;

moving a valve member of the first stage valve into a first position closing a port theretofore communicating the first portion of pressurized gas to a second stage control chamber and opening a vent from the second stage control chamber to an exhaust port thereby permitting the second stage control chamber to depressurize;

in response to the depressurization of the second stage control chamber, moving a valve member of said second stage valve into an inlet position to direct the second flow of pressurized gas into a primary control chamber to cause the primary control chamber to pressurize;

in response to the pressurization of the primary control chamber, moving the primary valve member into a closed position, thereby halting flow of the third portion of pressurized gases through the nozzle.

10. The method of claim 9, further comprising;

thereafter moving the valve member of the first stage valve into a second position opening a port to direct the first portion of pressurized gas into the second stage control chamber and closing a vent from the second stage control chamber to the exhaust port thereby permitting the second stage control chamber to pressurize;

in response to the pressurization of the second stage control chamber, moving a valve member of said second stage valve into an exhaust position thereby halting the second flow of pressurized gas flowing into the primary control chamber and opening a vent from the primary control chamber to an exhaust port to cause the primary control chamber to depressurize;

in response to the depressurization of the primary control chamber, moving the primary valve member into an open position, thereby directing the third portion of pressurized gases through the nozzle.

* * * * *